April 26, 1938.  G. C. STARKWEATHER ET AL  2,115,128
MUFFLER
Filed Dec. 14, 1936
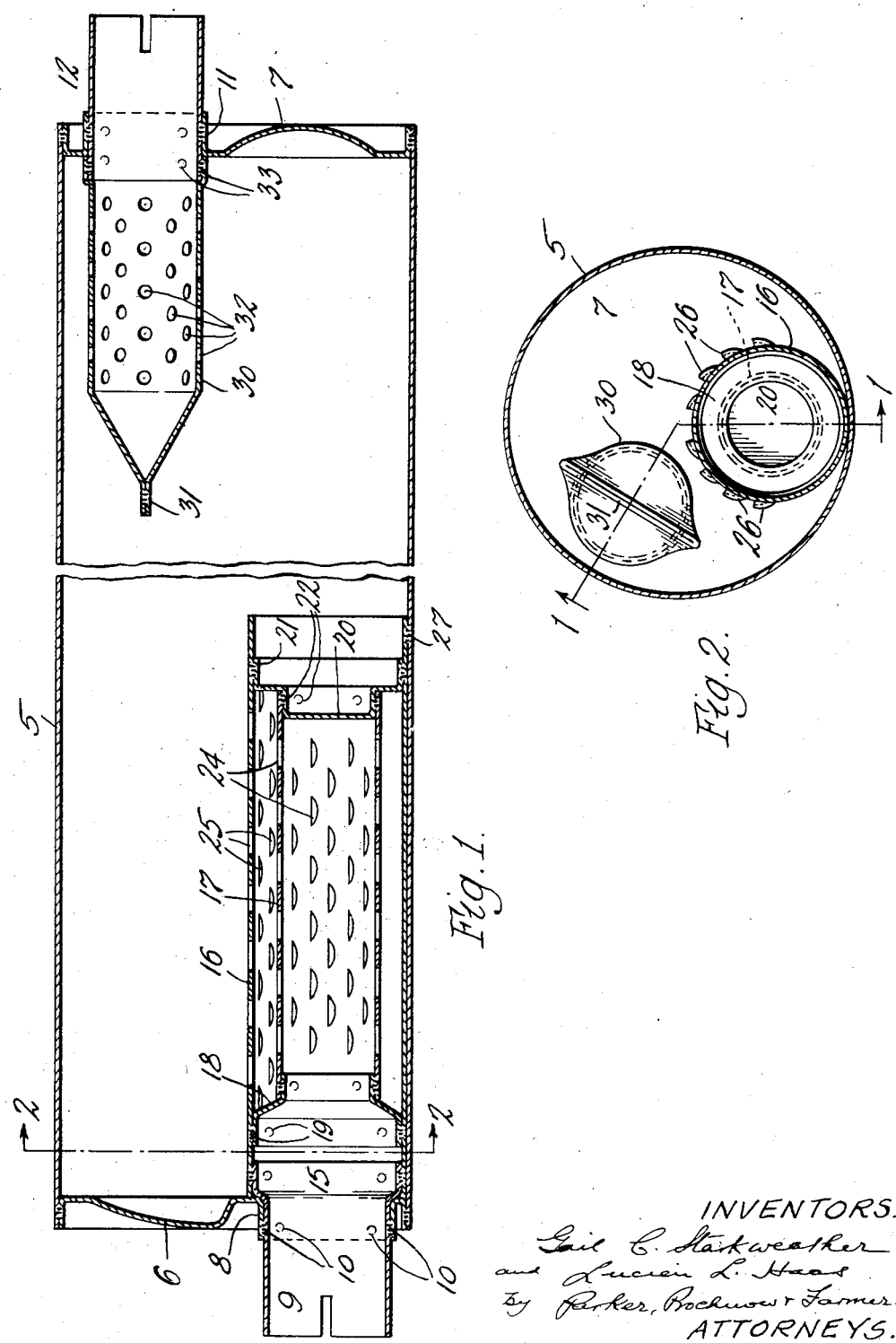
INVENTORS.
Gail C. Starkweather
and Lucien L. Haas
by Parker, Brockway & Farmer.
ATTORNEYS.

Patented Apr. 26, 1938

2,115,128

UNITED STATES PATENT OFFICE 2,115,128

MUFFLER

Gail C. Starkweather, Kenmore, and Lucien L. Haas, Buffalo, N. Y., assignors to Buffalo Pressed Steel Company, Buffalo, N. Y.

Application December 14, 1936, Serial No. 115,742

10 Claims. (Cl. 181—57)

This invention relates to improvements in mufflers for silencing the exhaust of internal combustion engines.

One of the objects of this invention is to provide a muffler of a construction which is particularly adapted for use in connection with a number of different motor vehicles or engines. It is also an object of this invention to provide a muffler which is of such construction that the same with slight changes can readily be adapted for use in connection with a plurality of different types of motor vehicles and engines. It is also an object of this invention to provide a muffler combining structural strength with a simple and inexpensive construction and good silencing effects. Other objects of the invention will appear from the following description and claims.

In the accompanying drawing:

Fig. 1 is a longitudinal sectional view on line 1—1, Fig. 2, of a muffler embodying this invention.

Fig. 2 is a transverse sectional elevation thereof, on line 2—2, Fig. 1.

The muffler shown in the drawing includes an outer shell 5 provided at opposite ends thereof with heads 6 and 7 which may be welded or otherwise secured to the outer shell. The head 6 of the muffler is provided with a suitable aperture or opening surrounded by an outwardly extending flange 8 within which an inlet tube or duct 9 of usual construction may be secured, for example, by means of welding as indicated at 10, the tube or duct 9 being intended for connection with the exhaust pipe (not shown) of an engine and to carry the exhaust gases and sound waves into the muffler. The other muffler head 7 is provided with an aperture surrounded by a flange 11 to which a discharge pipe or duct 12 may be welded or otherwise secured and to which the usual tail pipe (not shown) of an automobile may be attached. It will be noted that the inlet and discharge apertures in the heads 6 and 7 are arranged eccentrically with regard to these heads.

The inner end of the inlet pipe or duct 9 within the head 6 is preferably expanded or formed of larger diameter, as shown at 15 and to this portion of the inlet duct 9 is secured an intermediate shell or cylinder 16. Within the intermediate shell 16 is arranged an inner shell 17, one end of which is secured to the shell 16 adjacent to the inlet duct by means of a sleeve or collar 18 having an outer cylindrical portion which is suitably secured, for example, by means of welding as indicated at 19 to the intermediate shell and a smaller cylindrical portion of which is telescopically arranged with relation to the inner shell 17 and suitably welded or otherwise secured thereto. These shells 16 and 17 extend into the interior of the muffler and terminate at a distance from the inlet end thereof and are closed at the end remote from the intake head 6 in any suitable manner, for example, by means of a baffle 20, which, in the construction shown has an outer cylindrical portion 21 welded or otherwise secured within the intermediate shell 16 and an annular cylindrical portion 22 of a smaller diameter which is telescopically fitted to the end of the inner shell 17. The inner shell is provided with a series of apertures or slots 24 which may be arranged about the periphery thereof and through which the gases entering the inner shell from the inlet duct 9 pass into the space between the inner and intermediate shells. The intermediate shell is provided with a series of slots or openings 25 through which the gases are discharged into the relatively large chamber formed by the outer shell 5 and the heads 6 and 7. Preferably these slots 25 are located in the portions of the intermediate shell located at a distance from the outer shell and the slots or apertures 25 in the intermediate shell are at least partly covered by louvers 26, see Fig. 2 which preferably extend in such directions as to deflect the gases discharged through the openings 25 toward the middle portion of the large chamber formed by the shell 5. The intermediate shell 16 is preferably secured to the outer shell near the inner end of the intermediate shell, for example, by means of welding as shown at 27.

In the portion of the muffler thus far described, it will be noted that the intermediate shell 16 reinforces the muffler to materially increase the structural strength thereof, since the intermediate shell is welded at 27 to an intermediate portion of the outer shell and is also connected by welding to the inlet duct 9. Since it is frequently necessary in connection with mufflers of this general type to support the exhaust pipe leading to the muffler at some distance from the muffler, the inlet duct 9 of the muffler is subjected to considerable strain. By providing the inlet duct with an enlarged portion 15 which fits against the inner face of the head 6 about the aperture therein and by welding the duct to the head, and then further welding the shell 16 to the enlarged portion 15 and to the outer shell, it will be evident that a very rigid structure is produced by means of which the inlet duct 9 is braced against any strains to which it may be subjected.

In the operation of this portion of the muffler, the gases entering the inlet duct 9 pass into the inner shell and then through apertures 24 into the space between the inner and intermediate shells. The discharge of gases from the intermediate shell is effected in such a manner that the gases are deflected by the louvers 26 away from the adjacent walls of the outer shell 5. This construction, consequently, prevents the objectionable shell noises which are produced within mufflers when jets of gases are discharged from an inner conduit directly connected with the exhaust pipe against an outer shell. In the construction shown, this is prevented not only by the intermediate shell 16 which breaks up to a large extent the force of the jets discharged through the apertures 24 in the inner shell, but furthermore, when the gases are discharged from the intermediate shell they are deflected in such a manner as not to impinge against any adjacent portions of the outer shell. The construction shown, consequently, eliminates shell noises. The gases, after leaving the intermediate shell, enter into the relatively large expansion chamber formed by the outer shell 5 and the heads 6 and 7. This chamber is of ample size to receive the various pressure impulses or surges of gases and equalize them to such an extent that the gases passing through the discharge aperture in the head 7 will have a relatively uniform rate of flow and comparatively slight pressure pulsations. The inlet unit comprising the nested shells 16 and 17, of course, helps greatly in reducing the pressure pulsations, since the peaks of the pressure pulsations delivered by the engine are destroyed by first expanding the gases from the inner shell into the intermediate shell. Consequently, the pressure pulsations received by the large equalizing chamber of the muffler are more easily equalized or flattened out than would be the case if no intermediate shell were provided, and noises resulting from the discharge of the pressure pulsations into the atmosphere are greatly reduced or entirely eliminated.

In order to provide for further silencing of the noises of the exhaust and to provide a more uniform discharge of gases from the muffler, the muffler is provided with a perforate tube or shell 30, one end of which may be closed in any suitable manner, for example, by flattening the inner end of the tube and then welding the adjacent faces of the flattened portion 31 of this tube to each other. Any other means for closing the tube or shell 30 may be provided. This shell is also provided with a relatively large number of perforations 32 arranged about the periphery of the same, so that the gases from the large chamber within the outer shell 5 may enter into the perforated tube 30 in all directions toward the axis of this tube. The other end of this tube may be welded or otherwise secured at 33 to a portion of the discharge tube or duct 12 which extends into the interior of the muffler. The perforate tube or duct 30 further reduces the noises of the exhaust and tends to decrease pressure pulsations entering the tube.

Since the inlet and outlet openings in the heads 6 and 7 are eccentric, and since the silencing unit attached to the inlet duct is entirely separate from the silencing unit connected with the discharge pipe 12, it is possible to arrange the heads 6 and 7 in different angular relations to each other. For example, as shown in Fig. 2, the discharge unit or perforate shell 30 is located to the left of the inlet silencing unit. Obviously by turning either head of the muffler relatively to the other head, any degree of angular variation between the inlet and discharge units of the muffler may be obtained, so that mufflers of the construction described may be fitted to several different types of motor vehicles without requiring any other change in the mufflers. It is also possible to adapt the muffler construction shown to longer mufflers by simply elongating the shell 5. This makes it possible to construct mufflers of a variety of different kinds by using the same heads and inlet and discharge units completely assembled thereon, which lends itself particularly well to quantity production. Consequently, mufflers to fit different motor vehicles may be produced by changing the angular relation between the heads 6 and 7 relatively to each other and by varying the length of the outer shell 5.

Mufflers of the kind described can also be readily adapted to motor vehicles in which the exhaust pipes vary in diameter. In such cases, the inlet head 6 may be made identically as shown, except that the inlet aperture or opening and the flange 8 may be made of smaller diameter and an inlet duct 9 of smaller diameter may also be used. In such cases, however, the enlarged portion 15 of the inlet duct is enlarged or expanded to a greater extent so that it will fit within the intermediate shell 16. Consequently, with such mufflers, the inlet silencing unit and all other parts of the muffler may remain of the same sizes and proportions.

We claim as our invention:

1. A muffler including an outer shell, end heads secured to said outer shell, one of said heads being provided with an inlet opening and the other head having a discharge opening, said openings being arranged eccentrically on said heads, an inlet silencing unit connected with said inlet opening and an outlet silencing unit connected with said outlet opening, said units being arranged within said outer shell and out of contact with each other, at least one of said units being supported solely on one of said heads, whereby said heads may be secured to said outer shell in different relations to each other about the longitudinal axis of the muffler to place the inlet and discharge openings in different relative positions.

2. A muffler including an outer shell, end heads secured to said outer shell, one of said heads being provided with an inlet opening and the other head having a discharge opening, said openings being arranged eccentrically on said heads, an inlet silencing unit connected with said inlet opening and including a perforate inner shell into one end of which the gases enter from the inlet opening, the other end of said inner shell being closed, and an intermediate shell surrounding said inner shell and having discharge apertures therein for discharging gases into the space confined by said outer shell and said heads.

3. A muffler including an outer shell, end heads secured to said outer shell, one of said heads being provided with an inlet opening and the other head having a discharge opening, an inlet silencing unit connected with said inlet opening and including a perforate inner shell into one end of which the gases enter from the inlet opening, the other end of said inner shell being closed, and an intermediate shell surrounding said inner shell and having discharge apertures therein, and louvres on said intermediate shell for deflecting gases discharged through the apertures in said shell away from adjacent portions of said outer shell into the space confined by said outer shell and said heads.

4. A muffler including an outer shell, end heads secured to said outer shell, one of said heads being provided with an inlet opening and the other head having a discharge opening, said openings being arranged eccentrically on said heads, an inlet silencing unit connected with said inlet opening and including a perforate inner shell into one end of which the gases pass upon entering the muffler, the other end of said inner shell being closed, an intermediate shell surrounding said inner shell and arranged adjacent to a portion of said outer shell, said intermediate shell being provided with gas discharge apertures located at portions thereof spaced from said outer shell, the portion of said intermediate shell nearest to the outer shell being imperforate to prevent discharge of gases toward the outer shell in close proximity thereto.

5. A muffler including an outer shell, end heads secured to said outer shell, one of said heads being provided with an inlet opening and the other head having a discharge opening, said openings being arranged eccentrically on said heads, an inlet silencing unit connected with said inlet opening and having a perforate inner shell into one end of which the gases pass upon entering the muffler, intermediate shell surrounding the perforate portion of said inner shell and arranged substantially tangential to said outer shell and secured thereto, said intermediate shell having apertures through which gases are discharged into the space confined by said outer shell and said heads, and means for closing the other end of said inner shell and the adjacent end of said intermediate shell.

6. A muffler including end heads spaced apart and connected by a shell, one of said end heads having an inlet opening and the other end head having a discharge opening, a silencing unit within said muffler and connected with said inlet opening to receive gases therefrom and distribute the same into the space confined by said shell, and a silencing unit arranged within said muffler and into which gases pass before passing through said discharge opening, said silencing unit comprising a perforate tube connected at one end with said discharge opening, and having the walls of said tube at the other end thereof converging to close the end of said tube, and means for securing the walls of said other end of said tube in converged position.

7. A muffler including end heads spaced apart and connected by an outer shell, one of said end heads having an inlet opening and the other end head having a discharge opening, said openings being arranged eccentrically on said shells, a silencing unit arranged within said muffler and receiving gases from said inlet opening and including a perforate inner shell closed at the end thereof remote from said inlet opening, an intermediate shell surrounding said inner shell and having an aperture for discharging gases into said muffler, said intermediate shell being arranged with the inner portion thereof tangent to said outer shell and welded thereto.

8. A muffler including end heads spaced apart and connected by an outer shell, one of said end heads being provided with an inlet opening and the other end head having a discharge opening, said inlet opening being arranged eccentrically on its head, an inlet duct extending through said inlet opening from the exterior to the interior of said muffler and secured to said head, a silencing unit including an intermediate shell arranged within said muffler and having one end thereof secured to the portion of said inlet duct which extends into said muffler and having the opposite end thereof secured to said outer shell, and a perforate inner shell arranged in said intermediate shell and having one end open to receive gases from said inlet duct and having its other end closed.

9. A muffler including end heads spaced apart and connected by an outer shell, one of said end heads being provided with an inlet opening and the other end head having a discharge opening, said inlet opening being arranged eccentrically on its head, an inlet duct extending through said inlet opening from the exterior to the interior of said muffler, the portion of said inlet duct extending into the interior of said muffler being of larger diameter than the portion of said inlet duct extending through said opening, a silencing unit arranged within said muffler and including an intermediate shell having one end thereof rigidly secured to said portion of said inlet duct of greater diameter and having the other end thereof secured to said outer shell, and a perforate inner shell arranged in said intermediate shell and having one end open to receive gases from said inlet duct and having its other end closed.

10. A muffler including end heads spaced apart and connected by an outer shell, one of said end heads being provided with an inlet opening and the other end head having a discharge opening, said inlet opening being arranged eccentrically on its head, an inlet duct extending through said inlet opening from the exterior to the interior of said muffler, the portion of said inlet duct extending into the interior of said muffler being of larger diameter than the portion of said inlet duct extending through said opening, a silencing unit arranged within said muffler and including a shell having one end thereof rigidly secured to said portion of said inlet duct of greater diameter and having the other end thereof secured to said outer shell, said shell having an aperture to discharge gases into the interior of said muffler, and a perforate inner shell arranged within said last mentioned shell into which gases pass when first entering said muffler.

GAIL C. STARKWEATHER.
LUCIEN L. HAAS.